No. 639,996. Patented Dec. 26, 1899.
J. A. KELLY.
BICYCLE.
(Application filed June 1, 1898.)
(No Model.) 2 Sheets—Sheet 2.
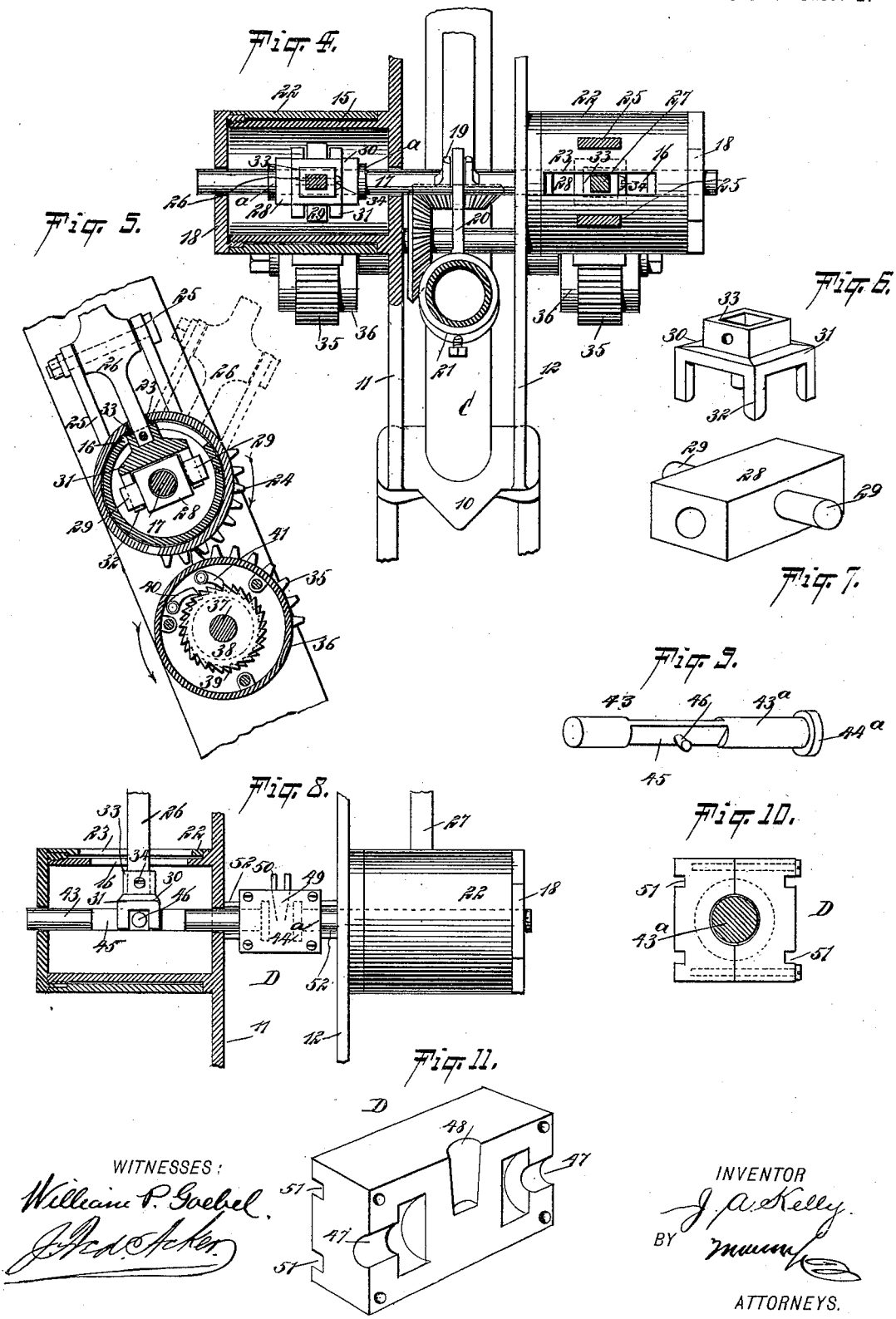

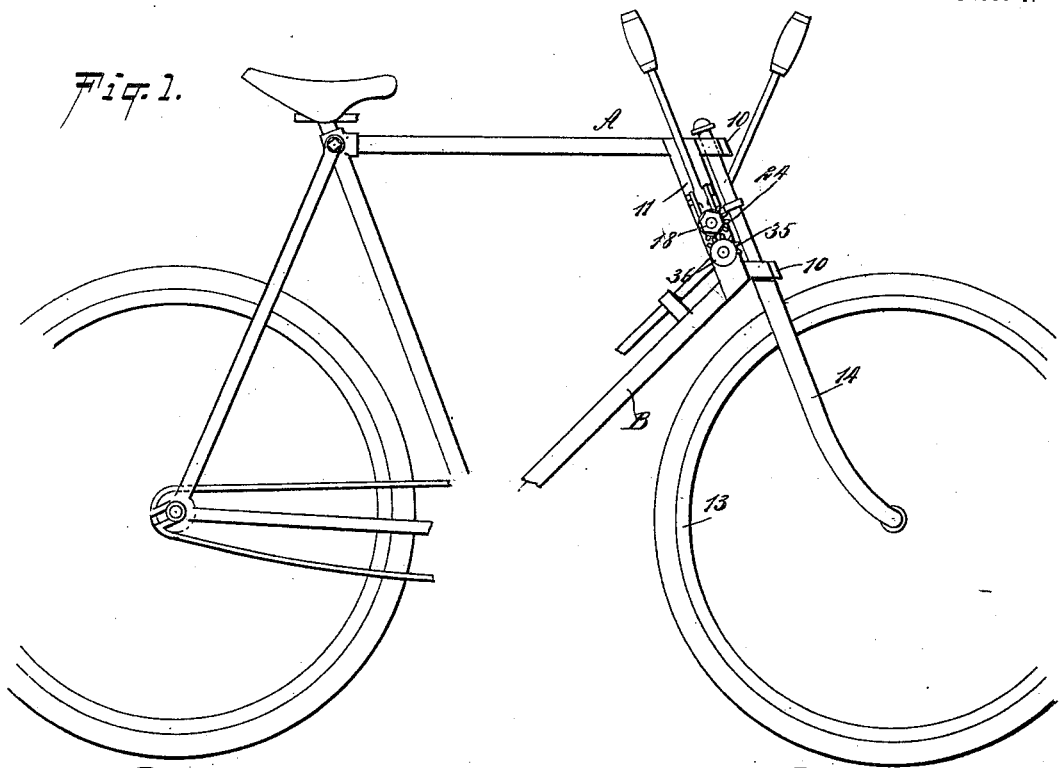

UNITED STATES PATENT OFFICE.

JOHN A. KELLY, OF NEW YORK, N. Y.

BICYCLE.

SPECIFICATION forming part of Letters Patent No. 639,996, dated December 26, 1899.

Application filed June 1, 1898. Serial No. 682,277. (No model.)

*To all whom it may concern:*

Be it known that I, JOHN A. KELLY, of the city of New York, borough of Brooklyn, in the county of Kings and State of New York, have invented new and useful Improvements in Bicycles, of which the following is a full, clear, and exact description.

The object of the invention is to so construct the driving mechanism of a bicycle that while the hands are used as drivers they may at the same moment be brought into action separately or together to steer positively and without lost motion and either to the right or to the left, and whereby the movement of the hands may be stopped or the driving action resumed at will without at any time losing control of the steering mechanism.

A further object of the invention is to accomplish the result above set forth by a simple and economic mechanism consisting of the smallest number of parts practicable and without additional weight to the machine other than the greater convenience of the added mechanism will justify.

I will describe a bicycle embodying my invention and then point out the novel features in the appended claims.

Reference is to be had to the accompanying drawings, forming a part of this specification, in which similar characters of reference indicate corresponding parts in all the figures.

Figure 1 is a side elevation of a bicycle to which the improvement is applied. Fig. 2 is a front elevation of the head portion of the bicycle and the attachment, the attachment at one side of the head being in section and in front elevation at the opposite side of the head. Fig. 3 is an enlarged side elevation of a portion of the head. Fig. 4 is a horizontal section taken practically on the line 4 4 of Fig. 3. Fig. 5 is a vertical section through the attachment, taken on the line 5 5 of Fig. 2. Figs. 6 and 7 are perspective views of devices for connecting the hand-levers with the steering rod or shaft. Fig. 8 is a partial front elevation and sectional view of a portion of the attachment, illustrating a modified form thereof. Fig. 9 is a perspective view of a portion of a steering-shaft used in a modified form. Fig. 10 is a section through the steering-shaft shown in Fig. 8 and an end view of a connecting device therefor, and Fig. 11 is a perspective view of one section of the connecting device.

The upper and lower main tubes A and B each terminate in a block or projection 10, which blocks or projections constitute bearings for the steering-post C. The head of the machine is formed by securing to the bearing-blocks 10 two parallel uprights 11 and 12. The front wheel 13, the steering-fork 14, and steering-post C are practically in the same relation to the frame as in any other bicycle; but, as above stated, the uprights 11 and 12 and the blocks 10 take the place of the ordinary tubular steering-head. A hollow cylinder 15 is shown as integral with each upright 11 and 12 or is attached thereto, the cylinders being threaded at their outer ends, and in the side of each cylinder a circumferential opening 16 is made for a purpose to be hereinafter specified.

A transverse steering bar or rod 17 is mounted to slide in the uprights 11 and 12 and longitudinally in the cylinders 15, and the ends of the steering-bar pass loosely through caps 18, screwed upon the ends of the cylinders, as shown particularly in Figs. 2 and 4. About centrally between the uprights a fork 19 is secured upon the steering-bar 17, as shown in Figs. 2 and 4. A projection 20 from the steering-post C is made to pass between the members of the fork 19, as shown especially in Fig. 4. The projection 20 may be and preferably is in the form of an arm, which is attached to the steering-fork by means of a band 21, a cleat, or its equivalent.

It is evident that when the steering-bar is moved endwise it will immediately produce a steering motion in the front wheel of the machine and that the steering action may be made very sensitive. The steering-bar is operated by means of the following-named mechanism: A sleeve 22 is loosely mounted upon each cylinder 15, being held in place by the cap 18 of the cylinder. A longitudinal slot 23 is made in the sleeve, arranged for registry with the opening 16 in the cylinders. A mutilated or segmental gear 24 is formed upon or secured to the under face of each sleeve 22, and a lug 25 is projected upward from each side of each sleeve at each side of the longitudinal slot 23 therein. A hand-lever is fulcrumed between each pair of lugs, said levers being designated as 26 and 27, by passing pins 27ᵃ through hubs in the levers and through the lugs, as shown in Fig. 5, the pins having a head at one end and a nut at the other.

The levers 26 and 27 are adapted to move forwardly and rearwardly and also sidewise or transversely. The lower ends of the hand-levers are passed through the slots 23 in the sleeves 22, being adapted to have guided and sliding movement therein, and the lower ends of the levers are likewise passed through the opening 16 in the cylinder 15 to an engagement with the steering-bar 17. A collar $a$ is located at each side of the normal center of the steering-bar within each cylinder, one of the collars being movable, and between each pair of collars a rotating shifting block 28 is loosely mounted upon the steering-bar. The rotating blocks are preferably rectangular in cross-section, as shown in Fig. 7, and at about the center of the front and rear faces of each rotating block a horizontal stud 29 is located, preferably circular in cross-section.

A foot 30 is provided for the lower end of each hand-lever. Each foot, as shown in Fig. 6, preferably consists of a rectangular body 31, a leg 32 being pendent from each corner of the body, shaped to receive the lower end of a hand-lever. The collar 33 is secured to the lever by a set-screw 34 or its equivalent. The bottom of the collar-body is furcated and intended to engage its legs 32 with the top of a rotating block 28, over which it is to be placed; but the legs 32 are adapted to extend downward along the front and rear faces of a rotating block at each side of the studs 29, the legs fitting close enough to the rotating block to carry the said block with them when the lever carrying the foot is given its driving or forward-and-rearward movement. The legs 32 are more or less rounded to lessen friction.

When the hand-levers are moved back and forth in driving the machine, the rotating blocks 28 turn upon the steering-bar 17 without effect upon said bar; but when one or both hand-levers are moved transversely or from side to side the pins 27ᵃ serve as the fulcrum, and the steering-bar will be given end movement by the action of the legs 32 upon the lugs 29, and the machine may be guided to the right or to the left, as desired. Obviously this steering can be done with either hand during its driving motion when necessary. It is further obvious that the steering action is effective by both hands together or separately, no matter at what part of the driving-arc the steering power is applied, owing to the power being applied at the center of the driving-arc, the only point constant with relation to the moving hands. The sleeve 22 may be made in two sections to facilitate the adjustment of the inner parts.

I do not confine myself to the exact means described for converting reciprocating into rotary motion, as shown in the parts 19 and 20, since other well-known means may be substituted.

When a hand-lever is operated in the plane of direction of the machine, it propels it by means of the gears 24, which mesh with gears 35, formed upon the periphery of boxes or drums 36, loosely mounted upon a shaft 37, which shaft is journaled in the uprights 11 and 12. Within each drum two ratchets 38 and 39 are secured to the shaft 37, their teeth being alternated to minimize the danger of slipping. Each ratchet-wheel is engaged by a separate dog, designated as 40 and 41, and the ratchet-wheels and their dogs are preferably made from fibroid or similar material in order that the action of the ratchets may be comparatively noiseless. As the drums are revolved the shaft 37 is revolved also, and a gear 42 upon the driven shaft 37 will communicate motion to a gear 43, secured upon a shaft mounted, for example, upon the bottom tube of the main frame, and this shaft may impart motion to a gear placed at the inside of the front chain-sprocket, for example, or a gear upon the pedal crank-shaft; but any well-known form of mechanism can be employed to utilize the driving power of the hands.

In Figs. 8, 9, 10, and 11 I have illustrated a modification of my invention. This modification consists, essentially, in dividing the steering apparatus into three parts. Two of said parts 43 are similar to each other, as shown in Figs. 8 and 9, and the third, the part D, is shown in Figs. 10 and 11. Each part 43 is supported inside one of the cylinders 15. The end of the part 43 is provided with a head 44ᵃ, and at or about its center in each side is a recessed flat surface 45, from which flat surfaces studs 46 are projected. The part 30, slightly narrowed, (see Fig. 6,) acts on the recessed part 45 and 46 as on the parts 28 and 29, already described. Mounted on the guides 52, between the uprights 11 and 12, is the part D, Figs. 10 and 11, arranged to move only in a transverse direction. This part D is made in two sections, one of the sections being shown in perspective in Fig. 11 and which is a duplicate of the other section. Each section is provided at each end with a longitudinal groove 47, enlarged at its inner end in order to receive the head 44ᵃ of the part 43. Each section of the part D is further provided at or near its center with a recess or depression 48, which is vertically produced therein and extends to the upper surface. This depression is adapted to receive a plug 49, provided with pins 50, forming a fork, and the said fork corresponds to the fork 19, which is secured to the shaft 17. (Shown in the other views.)

While the levers 26 and 27 are moving to and fro as drivers owing to the action of the part 30 on the recessed portions 45, the rods 43 move concentrically with the levers, the heads 44ᵃ turning within their bearings 47 in the part D without affecting the position of the said part D on its guides 52; but when the levers are moved transversely for steering that motion is immediately communicated through the studs 46 to the rods 43, thus moving the part D transversely on its guides to effect the steering of the vehicle.

Having thus described my invention, I claim as new and desire to secure by Letters Patent—

1. In a bicycle or like machine driven by hand-levers, hollow tubular supports for the hand-levers and within which the hand-levers extend, a steering apparatus comprising a transverse moving part adapted to actuate the steering-wheel of the machine and two auxiliary parts each supported inside one of the hollow tubular supports of the hand-levers, the said auxiliary parts being connected with the hand-levers at a point within the hollow tubular supports and connecting said hand-levers with the transverse-moving part to impart a transverse movement to the said part when the hand-levers are moved transversely for steering, substantially as described.

2. In a bicycle or like machine driven by hand-levers, supports for the said hand-levers, comprising two parts, a stationary part rigidly attached to the frame of the vehicle, said part being cylindrical, hollow and provided with a circumferential opening in its upper side, a movable part consisting of a longitudinally-slotted sleeve revolubly mounted upon the stationary part in such manner that the slot will register with the opening in the stationary element, the said movable part being provided with fittings suitable to hold the driving-levers in such a way that they may have a to-and-fro movement and may also move transversely to the line of direction of the vehicle, the two said supporting parts being arranged in such manner that an end of the hand-lever may extend through their registering openings into the interior of the said stationary element to engage with the steering mechanism of the vehicle, a driving mechanism, and a connection between the movable part of the support for the hand-lever and the driving mechanism, substantially as described.

3. In a bicycle driven by hand-levers, a jointed steering apparatus operated by the levers in a direction transverse to the line of travel of the bicycle, the said apparatus consisting of a central part connected with the steering-wheel and two outside parts similar to each other and capable of rotary movement the said outside parts being connected at their inner ends with the central part and connecting the central part with the levers, hollow cylindrical supports for the said steering apparatus and in which it has end movement, the said levers extending through openings in the said hollow supports and engaging the said outside parts of the steering apparatus, substantially as described.

4. In a bicycle or a like machine, a steering part having transverse movement and arranged for actuating the steering mechanism, tubular supports for the said transversely-moving parts each support comprising a fixed member having a removable cap at its outer end through which the steering part extends, and a sleeve loosely mounted upon the fixed member, the said fixed members having circumferential openings and the said sleeves having axial openings, lugs projected upward from each sleeve at each side of the axial opening, levers fulcrumed between the lugs and extending through said openings to an engagement with the steering part, the said levers being adapted to impart either end movement or rotary movement to the steering part to which they are connected, according as the levers are given movement in a transverse direction or movement in a forwardly-and-rearwardly direction, and a driving mechanism operated by the forward-and-rearward movement of the levers, substantially as set forth.

5. In a bicycle or a like machine, a transversely-moving part arranged for actuating the steering mechanism of the machine, supports for the said transversely-moving part, each support consisting of a fixed cylindrical member and a sleeve mounted to turn upon the cylindrical member, each fixed member being provided with a circumferential opening and each sleeve with an axial opening, levers passed through the said openings to an engagement with the transversely-moving part, being adapted to impart to the sleeves a rotary movement and to the transversely-moving part either a rotary or an end movement, gear-wheels on the said sleeves a driving-shaft, and connection between the driving-shaft and driving mechanism of the machine, and gear-wheels carried by the driving-shaft and in mesh with the gear-wheels on the said sleeves, for the purpose specified.

6. In a bicycle or like machine, the combination with hand-levers capable of independent action in a forwardly-and-rearwardly direction and likewise in a transverse direction, a steering part, supports for the steering part, each consisting of a fixed member and a sleeve mounted to turn on the fixed member, each fixed member having a circumferential opening and each sleeve an axial opening, the said hand-levers extending through the said openings and engaging the said steering part, whereby the said steering part will be given end movement when the lever is given transverse movement and a fork on the said steering part adapted to engage a projection from the steering-post of the machine, of a driving-shaft, a connection between the driving-shaft and the driving mechanism of the machine and gearing connected with the drive-shaft and operated by the forward or rearward movement of either of the said levers, as specified.

7. The combination of a head comprising two forgings or similar constructions provided with bearings for the steering-post of the machine and united by two substantially vertical and parallel supporting-posts, hollow supports carried by said posts and each consisting of a fixed member and a member mounted to rotate on the fixed member, hand-levers fulcrumed on the said movable members and entering the fixed members, the said levers being arranged to have driving motion in one direction and steering motion in another direction, a steering device having end movement in the said hollow supports and arranged to actuate the steering-post of the machine, connections between the hand-levers and the said steering device for steering purposes, gearing secured to the movable members of the supports, and a driving connection between the said gearing and the drive-wheel of the machine, substantially as described.

8. In a bicycle the combination of hand-levers for driving and steering purposes, two-part slotted supports for said levers arranged to enable them to move transversely and back and forth, driving connections between the outer movable elements of the slotted supports and a drive-wheel of the machine, two bars or rods passed longitudinally within the driving-supports, connected at recessed parts in their middle section with inwardly-projecting ends of the said levers, the bars or rods being capable of rotary movement and of transverse movement through the agency of said levers, a transversely-moving part, supported on guides set in the head of the vehicle and effectually connected for steering purposes with the steering-post of the vehicle, the said transversely-moving part being likewise connected with the said bars or rods at each of its sides in such manner that the transverse action of the driving-levers operates to steer the machine, substantially as described.

9. In a bicycle wholly or partly hand-driven, the combination of the hand driving-levers provided with suitable slotted supports on the frame of the machine the said slotted supports having movable elements adapted to be moved back and forth by the levers, the said levers each having forked-like terminations extending into the interior of the said supports, a steering device having transverse movement, and arranged to actuate the steering-post of the machine the said steering device being provided with projecting studs, adapted to be engaged by the forked-like terminations of the levers and a driving connection between the movable elements of the said slotted supports and the driving-wheel of the machine, substantially as described.

JOHN A. KELLY.

Witnesses:
T. W. BRACKETT,
J. E. CROAK.